(12) United States Patent
Schilling

(10) Patent No.: US 10,634,234 B2
(45) Date of Patent: Apr. 28, 2020

(54) TRANSMISSION

(71) Applicant: ZF Friedrichshafen AG, Friedrichshafen (DE)

(72) Inventor: Carl Schilling, Weingarten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 117 days.

(21) Appl. No.: 15/693,554

(22) Filed: Sep. 1, 2017

(65) Prior Publication Data

US 2018/0073626 A1   Mar. 15, 2018

(30) Foreign Application Priority Data

Sep. 9, 2016  (DE) .................. 10 2016 217 242

(51) Int. Cl.
*F16H 57/02*  (2012.01)
*F16H 57/04*  (2010.01)

(52) U.S. Cl.
CPC ......... *F16H 57/0424* (2013.01); *F16H 57/02* (2013.01); *F16H 57/0458* (2013.01); *F16H 57/045* (2013.01); *F16H 57/0443* (2013.01); *F16H 57/0453* (2013.01)

(58) Field of Classification Search
CPC ............. F16H 57/0443; F16H 57/0453; F16H 57/0452; F16H 57/045; F16H 57/0457; F16H 57/0458; F16H 57/04; F16H 57/042; F16H 57/0421; F16H 57/0423; F16H 57/0424; F16H 57/0409
See application file for complete search history.

(56) References Cited

U.S. PATENT DOCUMENTS

| 4,366,724 A | 1/1983 | Yamamori et al. |
| 4,995,971 A | 2/1991 | Droste et al. |
| 6,143,169 A | 11/2000 | Lee |
| 6,217,758 B1 | 4/2001 | Lee |

(Continued)

FOREIGN PATENT DOCUMENTS

| DE | 3021162 A1 | 12/1980 |
| DE | 10038081 A1 | 3/2001 |

(Continued)

OTHER PUBLICATIONS

Machine translation of JP H04-285356, obtained Mar. 28, 2019.*

(Continued)

*Primary Examiner* — Richard W Ridley
*Assistant Examiner* — Brian J McGovern
(74) *Attorney, Agent, or Firm* — Dority & Manning, P.A.

(57) ABSTRACT

A gearbox comprising a gearbox housing at least partially surrounding a cavity, an oil sump connected to the gearbox housing and surrounding another cavity, and a separating element separating the cavity from the other cavity and having a passage through which oil located in the cavity is fed into the other cavity. The passage is arranged in a plane at an intersection line between a first oil level upper side and a second oil level upper side. The oil is fed from the cavity into the other cavity exclusively through the passage. The separating element has a passage section and a separating section, the passage section protrudes from the separating section in the radial direction.

18 Claims, 8 Drawing Sheets

(56) References Cited

U.S. PATENT DOCUMENTS

| | | | |
|---|---|---|---|
| 7,174,996 B2* | 2/2007 | Hori ..................... | F16H 57/043 |
| | | | 180/292 |
| 7,637,336 B2 | 12/2009 | Enomoto et al. | |
| 10,036,468 B2* | 7/2018 | Zeller ................. | F16H 61/0009 |
| 2008/0066982 A1* | 3/2008 | Kobayashi ............. | F01M 5/001 |
| | | | 180/69.1 |
| 2014/0262675 A1* | 9/2014 | Sugiyama ........... | F16H 57/0445 |
| | | | 192/85.01 |
| 2015/0300220 A1* | 10/2015 | Mordukhovich .. | F01M 11/0004 |
| | | | 184/106 |
| 2016/0369653 A1* | 12/2016 | Plickys ............... | F15B 13/0814 |

FOREIGN PATENT DOCUMENTS

| | | | | |
|---|---|---|---|---|
| DE | 112006000430 | | 6/2008 | |
| JP | H04-285356 | * | 10/1992 | ......... F16H 57/0423 |
| WO | WO-2015174212 A1 | * | 11/2015 | |

OTHER PUBLICATIONS

Machine Translation of WO 2015/174212, obtained Oct. 13, 2019.*
German Search Report DE102016217242.5, dated Apr. 3, 2017. (10 pages).

* cited by examiner

TRANSMISSION

FIELD OF THE INVENTION

The invention relates generally to a gearbox with a gearbox housing which at least partially surrounds a cavity, an oil sump which is connected to the gearbox housing and surrounds another cavity, and a separating element which separates the cavity from the other cavity and has a passage through which oil located in the cavity can be fed into the other cavity.

The invention furthermore relates generally to a motor vehicle with such a gearbox.

BACKGROUND

A multiplicity of gearboxes with a gearbox housing and an oil sump attached to the gearbox housing are known from the prior art. In particular, the gearbox housing in the case of these gearboxes has, on the side facing the oil sump, an opening closed by the oil sump attached to the gearbox housing. Said gearboxes have the disadvantage that the oil not located in the oil sump sloshes during acceleration or braking operations. The oil likewise sloshes when cornering. Oil thereby enters rotating gearbox parts, such as, for example, clutches or toothings, which leads to high drag torques.

DE 11 2006 000 430 B4 discloses a gearbox with a gearbox housing and an oil sump. A cavity which is surrounded by the gearbox housing and another cavity which is surrounded by the oil sump are separated from each other by a separating element. The separating element has two openings through which the oil located in the cavity of the gearbox housing can flow into the other cavity of the oil sump. The two openings are arranged offset with respect to each other in the axial direction. In particular, one opening is arranged in a region of the gearbox in the vicinity of a motor vehicle drive unit and another opening is arranged in a region remote from the motor vehicle drive unit.

The known gearboxes have the problem that, during an acceleration or braking operation and/or during cornering, for example, of a motor vehicle in which the gearbox is installed, the oil can flow out of the other cavity of the oil sump into the cavity of the gearbox housing through the openings in the separating element, or that the oil located in the cavity of the gearbox housing cannot flow into the oil sump because of the oil sloshing in the other cavity. In both cases, oil collects in the cavity of the gearbox housing, which leads to the abovementioned drag torques and is therefore undesirable.

SUMMARY OF THE INVENTION

The object of the invention is to provide a gearbox in which the drag torque losses due to the oil located in the cavity are reduced.

This object is achieved by a gearbox wherein the passage is arranged in a plane in which an intersection line is arranged between a first oil level upper side and a second oil level upper side.

The gearbox according to the invention has the advantage that the provision of the passage in the plane enables the oil located in the cavity to return into the other cavity. This is possible since the most constant oil level over all of the operating states prevails in the plane, and therefore sloshing of the oil does not occur in this region and thus return of the oil is not prevented by the oil located in the oil sump. Since the oil does not slosh in the plane, the oil does not flow out of the other cavity into the cavity. A further advantage consists in that, during a braking or acceleration operation and/or cornering, the separating element prevents the oil from being able to enter into contact with the rotating gearbox components located in the cavity of the gearbox housing. The separating element therefore avoids drag losses.

Within the context of the invention, the separating element is a component by which the cavity of the gearbox housing can be separated from the other cavity of the oil sump such that the oil can flow out of the cavity into the other cavity only via defined points, namely the passage.

The oil located in the cavity results from the fact that a gear pump continuously conveys oil for lubricating and cooling gearbox components, such as, for example, clutches, toothings, bearings, electric machines, etc. Said conveyed oil has to be able to run back into the oil sump in order to avoid the above mentioned drag torque losses.

In this connection, the first oil level upper side can occur when a vehicle in which the gearbox is installed is braked and therefore a braking force acts on the gearbox. The second oil level upper side can occur when the vehicle is accelerated and therefore an acceleration force acts on the gearbox. The plane can contain the intersection line which results from the oil level upper sides during a braking operation with maximum braking force and during an acceleration operation with maximum acceleration force.

Of course, in addition or alternatively, the plane can have a further intersection line which results from an intersection of two oil level upper sides, in which the braking force and the acceleration force is not at maximum, but rather has a lower value. Alternatively, it is possible for the plane to have only a single intersection line. In this case, the two oil level upper sides always intersect at the same intersection line independent of the acceleration force and the braking force. The plane runs normally to a center axis of the gearbox.

In a particular embodiment, a third oil level upper side and a fourth oil level upper side can intersect at another intersection line. Another plane which has the other intersection line can contain the center axis of the gearbox or can run parallel to the center axis of the gearbox. In addition, the other plane can run perpendicular to a road surface and/or to the oil sump.

The passage can be arranged in both the plane and the other plane. The passage can therefore be arranged in an intersection region of the plane with the other plane. In particular, the passage is arranged such that it has a further intersection line between the plane and the other plane. This means that the passage is arranged such that the intersection line runs through it. An arrangement of the passage such that it has the further intersection line advantageously ensures that the oil located in the cavity can always be returned independent of the force which acts on the gearbox.

The third oil level upper side can occur if a transverse force acts on the vehicle and therefore on the gearbox. The fourth oil level upper side can occur if a transverse force directed oppositely to the transverse force acts on the vehicle and therefore on the gearbox. The transverse forces occur during cornering. In particular, the transverse force is directed perpendicularly to a center axis of the gearbox. The third oil level upper side can occur if the maximum transverse force acts on the vehicle, and the fourth oil level upper side can occur if the maximum other transverse force acts on the vehicle.

It is clear that the first and second oil level upper side can alternatively occur if the transverse force or the other transverse force acts on the vehicle and therefore on the gearbox. In this case, the third and fourth oil level upper side occurs if the braking force or acceleration force acts on the vehicle and therefore on the gearbox.

In a particular embodiment, the oil is returnable from the cavity into the other cavity exclusively through the passage. This means that no further passages through which the oil can flow out of the cavity into the other cavity are provided in the separating element.

The separating element can have a passage section and a separating section from which the passage section protrudes in the radial direction with respect to a center axis of the gearbox. The radial protrusion of the passage section has the advantage that it is possible in a simple manner to prevent the oil located in the oil sump from flowing undesirably through the passage into the cavity of the gearbox housing during a braking or acceleration operation and/or cornering.

The separating element is designable such that the oil sump and the separating element completely surround the other cavity. The separating element can be releasably connected to the gearbox housing and/or the oil sump. Alternatively, the separating element and the gearbox housing can be a single piece. This means that the separating element is part of the gearbox housing, which is particularly advantageous during the assembly of the gearbox since an additional assembly step for fastening the separating element to the gearbox housing and/or to the oil sump is unnecessary.

In a particular embodiment, the gearbox has a suction opening of a hydraulic control unit. The selection of the position of the suction point is significantly more free since, because of the separating element, only very little sloshing of the oil, if any at all, occurs, and therefore there is no risk of the suction opening being arranged in a region in which no oil is present during an acceleration or braking operation and/or cornering. It is very particularly advantageous to arrange the suction opening in the plane and/or in the other plane. This is advantageous as it is ensured that oil can always flow out of the oil sump into the hydraulic control unit via the suction opening. This is possible since a substantially constant oil level is always ensured in the plane. Therefore there is no risk of the suction opening being arranged in a region of the oil sump that no longer has any oil during an acceleration or braking operation and/or cornering.

The gearbox housing can have at least one inlet opening and a hole which is fluidically connected to the inlet opening, wherein the oil located in the cavity flows into the hole through the inlet opening. A fluidic connection between the inlet opening and the hole is present when the oil can flow from the inlet opening into the hole. As a result, the oil distributed in the cavity of the gearbox housing by the rotating gearbox components is trappable by the inlet opening and guided to the hole.

The hole can open at an end remote from the inlet opening into a collecting chamber located in particular in the gearbox housing. The collecting chamber can be bordered by the gearbox housing. The hole can extend in the axial direction with respect to the center axis of the gearbox. The trapped oil can collect in the collecting chamber and can flow out of the collecting chamber via an outlet opening. The provision of the collecting chamber affords the advantage that more oil can be accommodated in the gearbox because of the large volume of the collecting chamber.

It is very particularly advantageous if the hole is inclined with respect to the collecting chamber in the axial direction with respect to the center axis of the gearbox, i.e. the distance in the radial direction with respect to the center axis of the gearbox decreases toward the collecting chamber. It is thereby ensured in a very particularly simple manner that the oil which has flowed into the hole via the inlet opening passes to the collecting chamber.

The gearbox can have another separating element, such as, for example, a separating plate which separates the cavity into two regions. The other separating element can run in the radial direction, be formed normally with respect to the center axis, and separate the cavity in the axial direction with respect to the center axis of the gearbox, so that the two regions are adjacent to each other in the axial direction. A gear set which, for example, can have a plurality of planetary gear sets arranged in one region. No rapidly rotating gearbox components are arranged in the other region, which is separated by the other separating element, and therefore the oil located in the other region is not slung. The inlet opening can be arranged such that the oil slung by the gear set can flow into the hole via the inlet opening.

The outlet opening of the collecting chamber can be arranged in the separating element. Advantageously, the oil flows out of the collecting chamber into the other region in which the oil is no longer slung by the rotating gearbox components. It is very particularly advantageous if the passage is arranged in the other region. In this case, the oil which has flowed out through the outlet opening is returnable in a simple manner, in particular without the risk of renewed slinging, into the oil sump.

The gearbox can have guides which guide the oil which has emerged from the collecting chamber in the direction of the passage. In particular, the guides can prevent a flow of the oil in the axial direction and permit only a flow in the radial and/or tangential direction with respect to the center axis of the gearbox.

In a very particular embodiment, the gearbox can have an electric machine. The electric machine can be operatively connected to the gear set arranged in the cavity of the gearbox housing, in particular to the gear set arranged in the region. The gearbox can be a multi-speed gearbox, in which a predefined number of gear speeds, i.e. fixed transmission ratios between the input shaft and a main gearbox output shaft, is shiftable by shift elements. Main gearboxes of this type are used especially in motor vehicles in order to adapt the rotational speed and torque output capability of the motor vehicle drive unit to the driving resistance of the vehicle in a suitable manner.

A very particular advantageous embodiment of the invention is a motor vehicle which has the gearbox. The gearbox can be operatively connected or operatively connectable to a motor vehicle drive unit, such as, for example, an internal combustion engine.

BRIEF DESCRIPTION OF THE DRAWINGS

The subject matter of the present invention is further described below with reference to the figures, wherein identical or identically acting elements are provided with the same reference signs. The following is shown.

DETAILED DESCRIPTION

Figure 1:
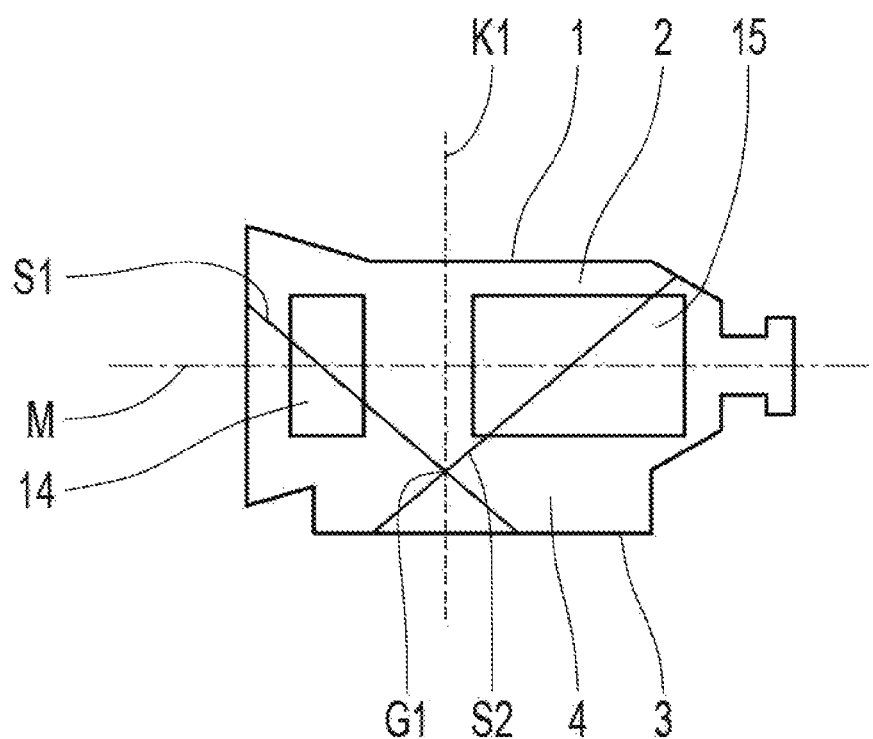
FIG. 1 shows a side view of a gearbox known from the prior art with oil levels during a braking and acceleration operation.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The gearbox shown in FIG. 1 has a gearbox housing 1 which surrounds part of a cavity 2. A gearbox component 14 and another gearbox component 15 are arranged in the cavity 2. The gearbox component 14 can be a clutch. The other gearbox component 15 can have a gear set which, for example, has a plurality of planetary gear sets. Through the gear set of shift elements (not shown), a plurality of gear speeds is realizable. The gearbox component 14 is arranged in the gearbox such that the gearbox component 14 is arranged closer to a motor vehicle drive unit MV than the other gearbox component 15. The gearbox has an oil sump 3 which surrounds another cavity 4 and is arranged in the radial direction below the gearbox housing 1. The oil sump 3 is attached to the gearbox housing 1.

FIG. 1 also illustrates the course of a first oil level upper side S1 during a braking operation and the course of a second oil level upper side S2 during an acceleration operation. The first oil level upper side S1 and the second oil level upper side S2 intersect at an intersection line G1. The intersection line G1 is arranged in a plane K1 which runs perpendicular with respect to a center axis M of the gearbox. During a braking operation, the oil sloshes such that it contacts the gearbox component 14. During an acceleration operation, the oil sloshes such that it contacts the other gearbox component 15.

The course of the first and second oil level upper side S1, S2 is dependent on the acceleration force or braking force acting on the gearbox. The gradient of the first and second oil level upper sides S1, S2 thus depends on the braking force or acceleration force acting on the gearbox. If no force acts on the gearbox, an oil level upper side, not illustrated in the figures, parallel to the center axis and/or to a horizontal axis occurs. The oil level located in the gearbox is constant. This means that no oil is fed into the gearbox from outside the gearbox or is removed therefrom.

Figure 2:
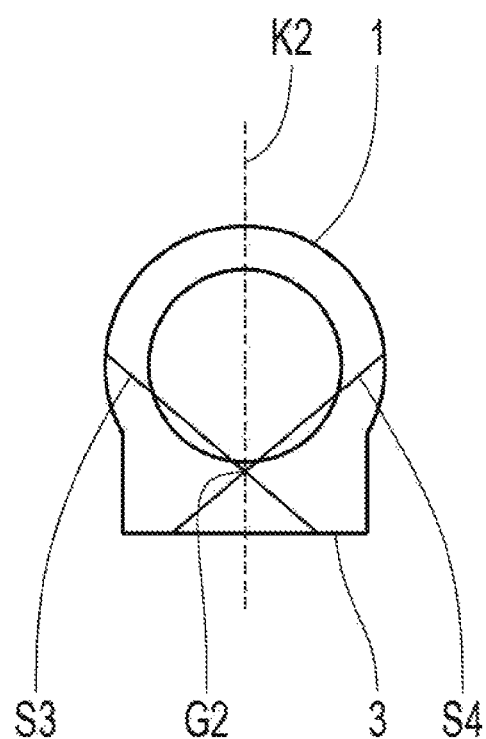
FIG. 2 shows a front view of the gearbox known from the prior art with oil levels during cornering.

FIG. 2 shows a front view of the gearbox known from the prior art. FIG. 2 shows the course of a third oil level upper side S3 and a fourth oil level upper side S4. The two oil level upper sides occur during cornering of a vehicle in which the gearbox is installed. Depending on the cornering, a transverse force acts on the gearbox and brings about the corresponding course of the oil level upper side. The direction of the transverse force depends on the cornering direction.

The third oil level upper side S3 and the fourth oil level upper side S4 intersect at another intersection line G2. Another plane K2 has the other intersection line G2 and is perpendicular to the oil sump 3. The other plane K2 runs parallel to the center axis M of the gearbox and/or contains the center axis M.

Figure 3:
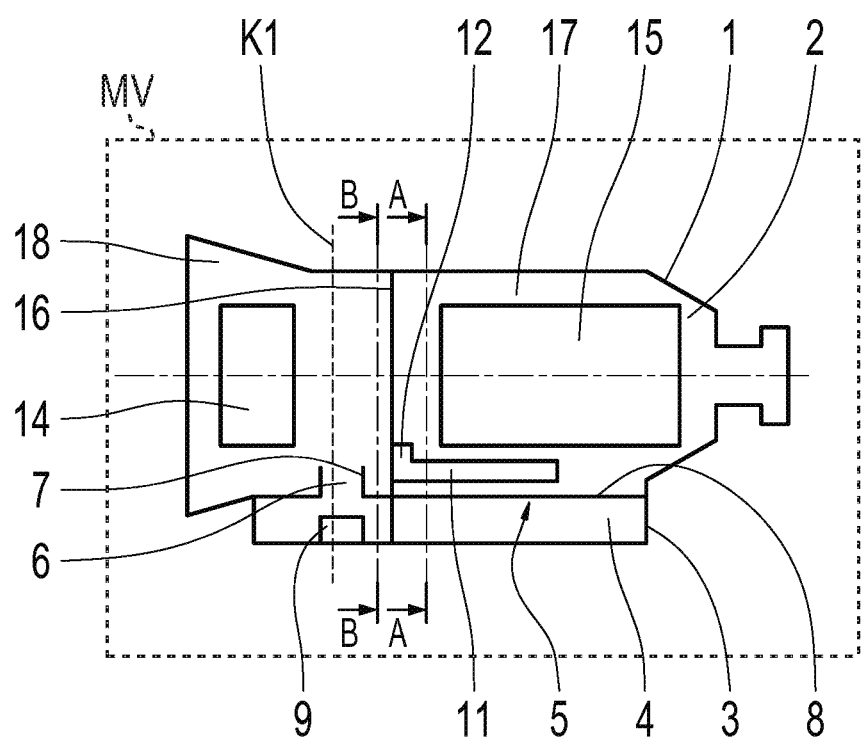
FIG. 3 shows a gearbox according to the invention.
Figure 8:
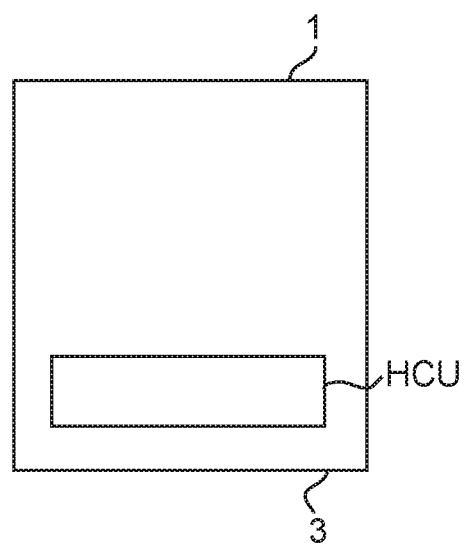
FIG. 8 shows a schematic illustration of a hydraulic control unit of the gearbox according to the invention.

FIG. 3 shows a gearbox according to the invention. The gearbox differs from the gearbox illustrated in FIG. 1 in that the other cavity 4 of the oil sump 3 is separated from the cavity 2 of the gearbox housing 1 by a separating element 5. The separating element 5 has a passage 6 through which the oil located in the cavity 2 can flow in order to pass into the oil sump 3. The passage 6 is arranged such that the plane K1 has the passage 6. Furthermore, the gearbox has a suction opening 9 for a hydraulic control unit HCU (shown in FIG. 8) which is arranged in the oil sump 3. In particular, the suction opening 9 is arranged in the plane K1.

The separating element 5 has a passage section 7 and a separating section 8. The passage 6 is provided in a passage section 7 of the separating element 5. The separating section 8 extends in the radial direction from the passage section 7 in a direction away from the oil sump 3. The separating section 8 is of flat design.

The gearbox has another separating element 16 which divides the cavity 2 into a region 17 in which the gearbox component 15 is arranged and into another region 18 in which the passage is arranged. Furthermore, the gearbox has a hole 11 which runs in the axial direction and opens in a collecting chamber 12. The oil located in the region 17 is slung by the rotating gearbox component, such as, for example, the gear set, into the hole via an inlet opening 10, which is shown in FIG. 4.

Figure 5:
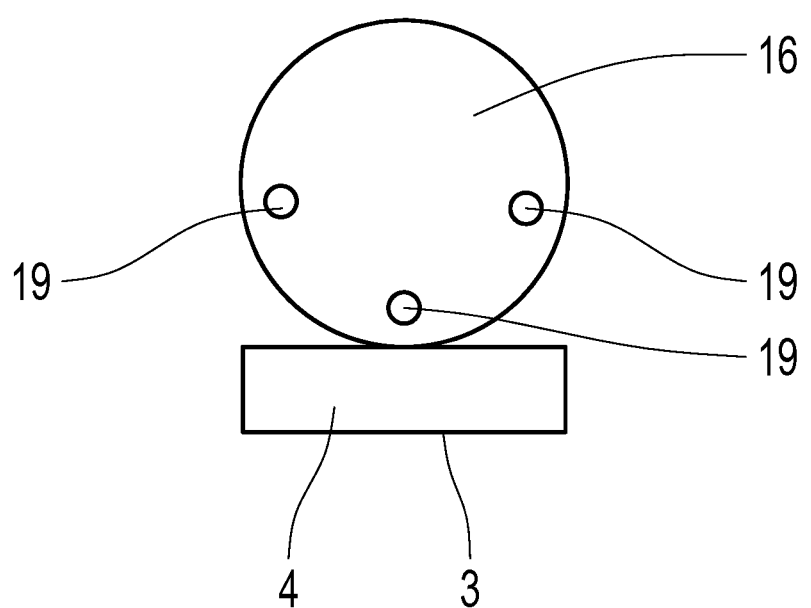
FIG. 5 shows a view along the line B-B shown in FIG. 3.

The collecting chamber 12 has an outlet opening 19 shown in FIG. 5. The outlet opening 19 is arranged in the other separating element 16, and through which oil flows into the other region 18. The oil which has flowed into the other region 18 flows through the passage 6 into the oil sump 3. This is possible because the gearbox component 14 does not rotate so rapidly that the oil which has flowed into the other region 18 is entrained by the gearbox component 14.

Figure 4:
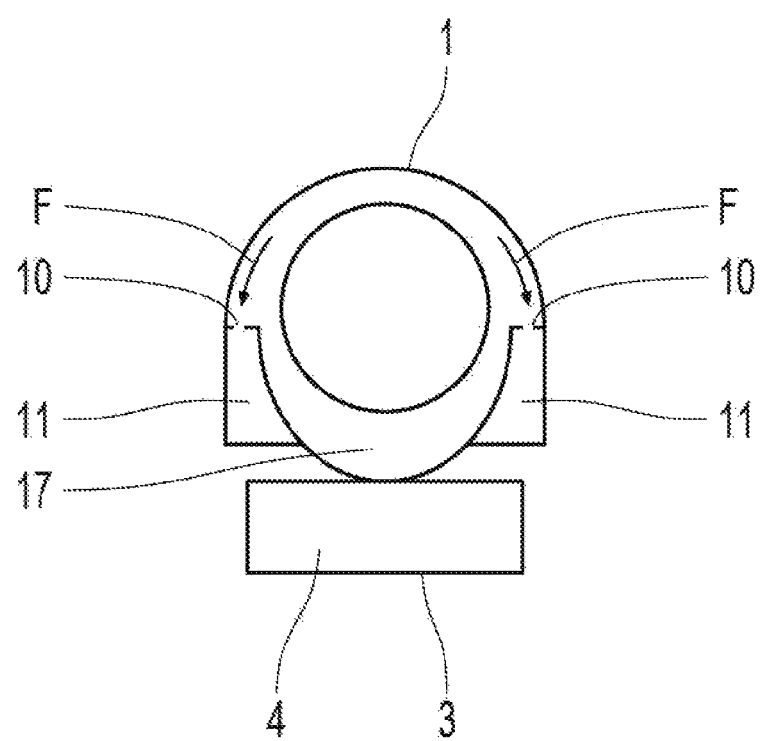
FIG. 4 shows a view along the line A-A shown in FIG. 3.

FIG. 4 shows a front view of the gearbox, which is illustrated in FIG. 3, along the line A-A. It is apparent from FIG. 4 that the gearbox has a plurality of inlet openings 10 and a plurality of holes 11. The oil located in the region 17 is entrained by the rotating gearbox component 15, slung in direction F, and flows into the hole 11 via the inlet openings 10 arranged in the gearbox housing 1. From the hole, the oil flows in the axial direction to the collecting chamber 12.

FIG. 5 shows a front view of the gearbox, which is illustrated in FIG. 3, along the line B-B. In particular, FIG. 5 shows a front view of the other separating element 16. The other separating element 16 has three outlet openings 19 which are arranged offset with respect to one another in the circumferential direction of the other separating element 16. Each of the outlet openings 19 is assigned to a collecting chamber 12.

Figure 6:
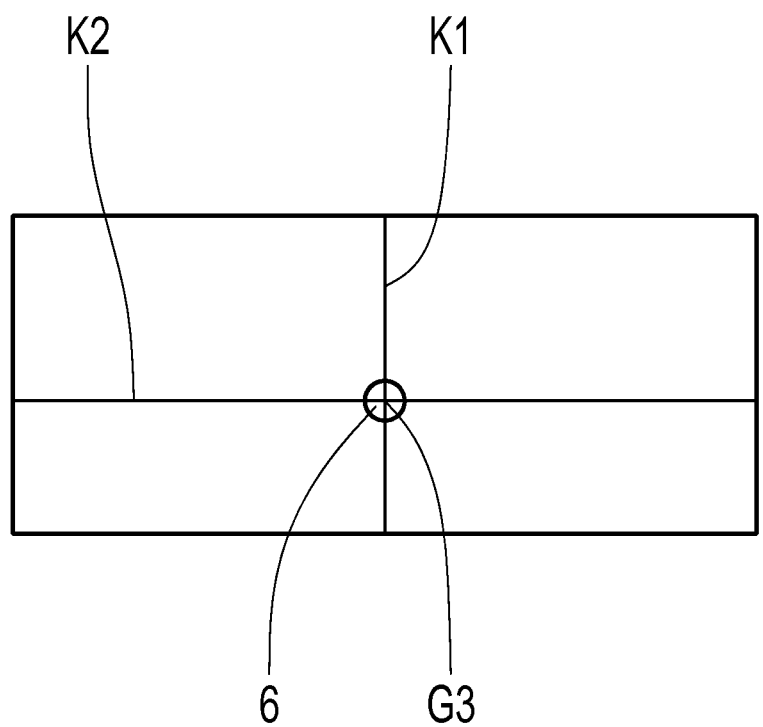
FIG. 6 shows a top view of the gearbox according to the invention.

FIG. 6 shows a top view of the gearbox. FIG. 6 shows the course of the plane K1 and of the other plane K2. The two planes intersect at a further intersection line G3. The passage 6 is arranged in the intersection region of the two planes K1, K2. In particular, the passage 6 is arranged such that it has the further intersection line G3 and/or that the further intersection line G3 runs therethrough.

Figure 7:
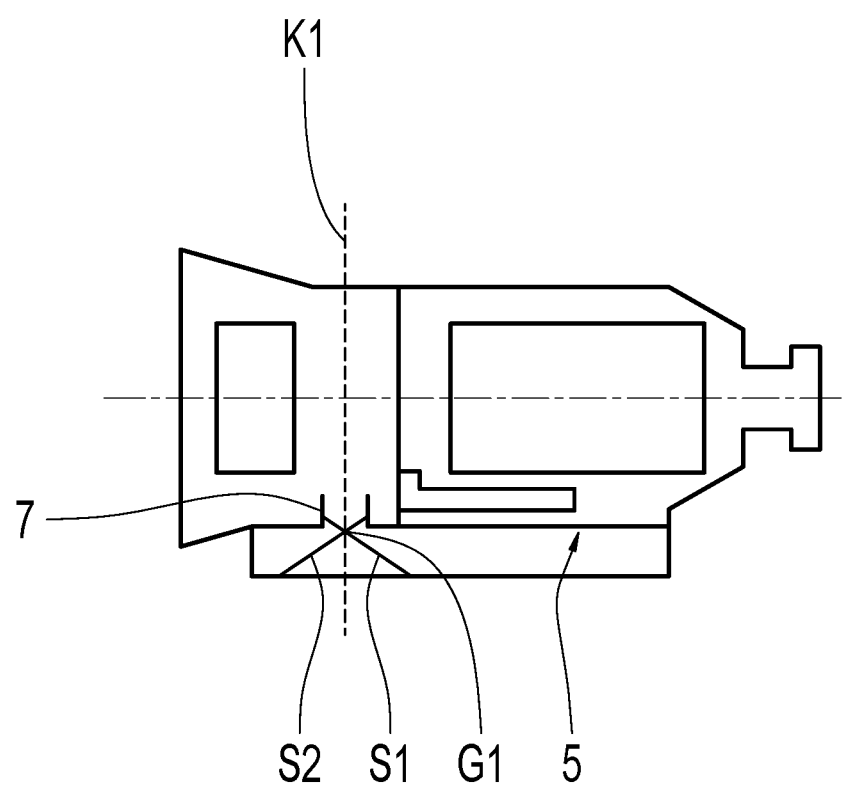
FIG. 7 shows a gearbox according to the invention during an acceleration and a braking operation.

FIG. 7 shows the course of the oil level upper sides S1, S2 during an acceleration operation and a braking operation. During braking, the first oil level upper side S1 occurs. The oil sloshes such that some of the oil is located in the passage section 7. The separating element 5 prevents the oil from sloshing such that it contacts the gearbox component 14. During an acceleration operation, the second oil level upper side S2 occurs. The separating element 5 prevents the oil from entering into contact with the other gearbox component 15. The oil which is sloshed up is partially located in the passage section 7.

The first and second oil level upper sides S1, S2 intersect at the intersection line G1 arranged in the plane K1.

Modifications and variations can be made to the embodiments illustrated or described herein without departing from the scope and spirit of the invention as set forth in the appended claims.

REFERENCE SIGNS

1 Gearbox housing
2 Cavity
3 Oil sump
4 Other cavity
5 Separating element
6 Passage
7 Passage section
8 Separating section
9 Suction opening
10 Inlet opening
11 Hole
12 Collecting chamber
14 Gearbox component
15 Other gearbox component
16 Other separating element
17 Region
18 Other region
19 Outlet opening
G1 Intersection line
G2 Other intersection line
G3 Further intersection line
K1 Plane
K2 Other plane
S1 First oil level upper side
S2 Second oil level upper side
S3 Third oil level upper side
S4 Fourth oil level upper side

The invention claimed is:

1. A multi-speed gearbox, comprising:
a gearbox housing (1) at least partially surrounding a cavity (2);
an oil sump (3) connected to the gearbox housing (1) and surrounding another cavity (4);
a separating element (5) positioned between the cavity (2) and the other cavity (4) and having only one passage (6) through which oil located in the cavity (2) is fed into the other cavity (4); and
a hydraulic control unit (HCU) having a suction opening (9),
wherein the passage (6) is arranged in a plane (K1) at an intersection line (G1) between a first oil level upper side (S1) and a second oil level upper side (S2),
wherein the oil is fed from the cavity (2) into the other cavity (4) exclusively through the passage (6),
wherein the suction opening (9) is arranged in the plane (K1), and
wherein the separating element (5) comprises a passage section (7) and a separating section (8), the passage section (7) defining the passage (6) and protruding from the separating section (8) into the cavity (2), and the separating section (8) extending to the gearbox housing (1).

2. The gearbox of claim 1, wherein the separating element (5) is discrete from the gearbox housing (1) such that the separating element (5) is releasably connected to the gearbox housing (1).

3. The gearbox of claim 1, wherein the separating element (5) is discrete from the oil sump (3) such that the separating element (5) is releasably connected to the oil sump (3).

4. The gearbox of claim 1, wherein the gearbox housing (1) and the separating element (5) are integrally formed.

5. The gearbox of claim 1, wherein the gear-box housing (1) defines at least one inlet opening (10) and a hole (11), the hole (11) is fluidically connected to the at least one inlet opening (10), and the oil in the cavity (2) flows into the hole (11) through the at least one inlet opening (10).

6. The gearbox of claim 5, wherein the hole (11) opens at an end remote from the at least one inlet opening (10) into a collecting chamber (12).

7. The gearbox of claim 6, wherein the collecting chamber (12) has an outlet opening (19).

8. The gearbox of claim 7, further comprising an additional separating element (16) which separates the cavity (2) into two regions, wherein a gear set of the gearbox is arranged in one region (17) of the two regions.

9. The gearbox of claim 8, wherein the outlet opening (19) is arranged in the additional separating element (16).

10. The gearbox of claim 8, wherein the passage (6) is arranged in the other region (18) of the two regions.

11. The gearbox of claim 1, wherein a third oil level upper side (S3) and a fourth oil level upper side (S4) intersect at another intersection line (G2), and another plane (K2) has the other intersection line (G2).

12. The gearbox of claim 11, wherein both the plane (K1) and the other plane (K2) have the passage (6).

13. The gearbox of claim 11, wherein the third oil level upper side (S3) occurs in the oil sump (3) when a transverse force acts on the gearbox, and the fourth oil level upper side (S4) occurs when another transverse force directed oppositely to the transverse force acts on the gearbox.

14. The gearbox of claim 1, wherein the first oil level upper side (S1) occurs in the oil sump (3) when a braking force acts on the gearbox, and the second oil level upper side (S2) occurs when an acceleration force acts on the gearbox.

15. A motor vehicle with the gearbox of claim 1.

16. The gearbox of claim 1, wherein the plane (K1) is perpendicular to a center axis (M) of the gearbox.

17. The gearbox of claim 1, wherein the first oil level upper side (S1) occurs in the oil sump (3) when a maximum braking force acts on the gearbox, and the second oil level upper side (S2) occurs when a maximum acceleration force acts on the gearbox.

18. The gearbox of claim 1, wherein the hydraulic control unit (HCU) and the suction opening (9) are arranged in the oil sump (3).

* * * * *